(12) United States Patent
Marten

(10) Patent No.: US 6,518,725 B2
(45) Date of Patent: Feb. 11, 2003

(54) CHARGE BALANCING SYSTEM

(75) Inventor: Victor Marten, Flushing, NY (US)

(73) Assignee: SemTech Corporation, Camarillo, CA (US)

( * ) Notice: Subject to any disclaimer, the term of this patent is extended or adjusted under 35 U.S.C. 154(b) by 0 days.

(21) Appl. No.: 10/181,851

(22) PCT Filed: Jan. 24, 2001

(86) PCT No.: PCT/US01/02391

§ 371 (c)(1),
(2), (4) Date: Jul. 11, 2002

(87) PCT Pub. No.: WO01/56062

PCT Pub. Date: Aug. 2, 2001

(65) Prior Publication Data

US 2002/0190692 A1 Dec. 19, 2002

Related U.S. Application Data

(60) Provisional application No. 60/178,887, filed on Jan. 28, 2000.

(51) Int. Cl.[7] .................................................. H02J 7/00
(52) U.S. Cl. ........................................ 320/116; 320/118
(58) Field of Search ................................. 320/116, 117, 320/118, 119, 121, 166

(56) References Cited

U.S. PATENT DOCUMENTS

5,710,504 A * 1/1998 Pascual et al. .............. 320/118
6,081,095 A 6/2000 Tamura et al. .............. 320/118
6,121,751 A 9/2000 Merritt ........................ 320/116

FOREIGN PATENT DOCUMENTS

WO   WO/99-21241   4/1999

* cited by examiner

*Primary Examiner*—Michael Sherry
*Assistant Examiner*—Lawrence Luk
(74) *Attorney, Agent, or Firm*—Oppedahl & Larson LLP

(57) ABSTRACT

The problem of battery failure due to failure of one cell in a rechargeable battery, and the related problem of inefficient use of a battery over its dynamic range due to differences between the performance of cells in a battery, are addresses by providing one or more capacitors selectively coupled to the various cells of the battery. The selective and repetitive coupling of capacitors to the cells permits balancing of charge among the cells. This minimizes the risk that any one cell would suffer catastrophic failure due to being fully charged or discharged prior to the other cells in the battery. This also permits making use of the battery over nearly all of its dynamic range. In this way, battery life is maximized.

3 Claims, 3 Drawing Sheets

CHARGE BALANCING SYSTEM

This application claims priority from U.S. appl. No. 60/178,887, filed Jan. 28, 2000, which application is incorporated herein by reference to the extent permitted by law.

The invention relates generally to the problem of limited service life in multi-cell batteries, and relates more specifically to approaches for balancing of charge among cells.

BACKGROUND

Many users want appliances to be portable, even if the appliances have historically been fixed in position due to the need for power and other connections. For many appliances, it is a straightforward matter to make the appliance portable by shrinkng it (making it smaller) and by powering it with battery power rather than line power. For those who are given the task of making an appliance portable, however, it soon becomes clear that there are many problems to be solved before the appliance will fill user expectations. For example, in a personal computer or personal digital assistant or wireless telephone, the user naturally wants long battery life as well as minimal weight. It is further desirable that battery life be long in two distinct senses—the battery should last a long time in use, between rechargings; and the battery should survive a large number of charge/discharge cycles. Where disposable batteries are used, the former is the only concern, but many users prefer to use rechargeable batteries for which both senses of the term "long life" are relevant.

One way to try to maximize battery life is by selecting a battery technology appropriately for the task. Some early personal computers used sealed lead-acid batteries. For many years the prevailing battery technology was nickel-cadmium More recent choices have included nickel-metal-hydride and lithium ion technology. From the user's point of view, it is desirable to select a technology that offers a high specific capacity (capacity versus weight) so as to reduce the weight of the appliance.

These "long life" goals are not easy to meet. In any battery (defined as a plurality of cells in series) there is the problem that the cells are not perfectly identical, even though the battery manufacturer will try as hard as possible to match the cells with each other. Because the cells are not identical, they do not have identical capacities. If a battery is allowed to run down nearly to full discharge, one cell will reach full discharge before its neighbors, and will suffer chemical degradation if current continues to be forced through it (by its neighbors) during further discharge. This so-called "reverse charging" problem can ruin a cell in a very short time, depending on its particular technology.

Yet another problem arises when the battery is to be recharged. Suppose the cells were to have identical charging qualities, that is, that a particular charge forced through each cell would give rise to precisely the same extent of recharging. Even with such cells, the problem is that they might not have begun with the same level of charge (due to previous use, for example). As such, if they are series-connected and given a particular amount of charging current, they would not reach full charge simultaneously. As a general matter, one cell would reach full charge sooner than its neighbors. Such a cell faces the problem of having to find some way to dissipate excess energy, typically through radiated heat, during the time when the remaining cells continue to be charged. This "overcharging" problem can damage a cell through any of a number of mechanisms (depending on the cell technology) including the conversion of water to steam. In real life, cells do not have identical charging qualities, so this problem (of one cell reaching full charge before its neighbors do) is exacerbated.

While some cell technologies are fairly accommodating of problems like reverse charge and overcharging, other technologies are quite vulnerable to them Even the most accommodating technologies, however, will sooner or later lead to a "bad cell" in a battery, whether due to reverse charging, overcharging, or some other failure mode. When a cell goes bad, typically the battery must be removed from service and replaced by a new battery.

One approach for protecting against reverse charging is to stop using the, battery (and then to recharge it) well before any of the cells could possibly have reached full discharge. This approach leads to a rather poor ratio of weight to service life between rechargings.

One approach for protecting against overcharging is to stop charging the battery (and then to start using it) well before any of the cells could possibly have reached full charge. This approach, too, leads to a rather poor ratio of weight to service life between rechargings.

Experience shows that the life of a particular cell is not typified by perfect and identical performance for many cycles, followed by catastrophic failure as a "bad cell." Instead, the life of a particular cell is typified by slight degradations in performance over its life, followed by catastrophic failure. (Of course, most cells never actually reach catastrophic failure because they are part of a battery that is removed for service because some other cell in the battery has reached catastrophic failure.) Slight degradations include small losses in charging efficiency, and small increases in the internal resistance of the cell giving rise to waste heat during discharge and charging. Such degradations would be only a small problem if they affected all cells equally, but of course experience with actual cells shows that they are not uniform across all cells.

Such slight degradations, if not provided for in the battery system design, set the stage for imbalances which will accelerate the progress toward eventual catastrophic loss of a single cell.

This accelerated progress toward failure may be described as a "race to the bottom," in which the life of the battery is essentially defined by (and United by) the life of the worst cell It would thus be extremely desirable if a system could be devised which would minimize the extent to which non-identically of cells in a battery leads to premature catastrophic failure of any one cell. It would also be extremely desirable if such a system could likewise permit use of a battery over a wide dynamic range, e.g. from nearly full charge to nearly full discharge, thus maximizing battery life between chargings, all without taking unnecessary risk of reverse charging or overcharging.

One approach to this problem may be seen in PCT publication no. 99-21241, published Apr. 29, 1999 and entitled Improved voltaic pile with charge equalizing system. The arrangement in the PCT publication, however, has a relatively high component count. It would be desirable to devise an approach having a smaller component count.

SUMMARY OF THE INVENTION

The problem of battery failure due to failure of one cell in a rechargeable battery, and the related problem of inefficient use of a battery over its dynamic range due to differences between the performance of cells in a battery, are addressed by providing one or more capacitors selectively coupled to the various cells of the battery. The selective and repetitive coupling of capacitors to the cells permits balancing of charge among the cells. This minimizes the risk that any one cell would suffer catastrophic failure due to being fully charged or discharged prior to the other cells in the battery. This also permits making use of the battery over nearly all of its dynamic range. In this way, battery life is maximized.

DESCRIPTION OF THE DRAWINGS

The invention will be described with respect to a drawing in several figures, of which.

Where possible, like elements have been denoted among the figures using like reference numerals.

DETAILED DESCRIPTION

Figure 1:
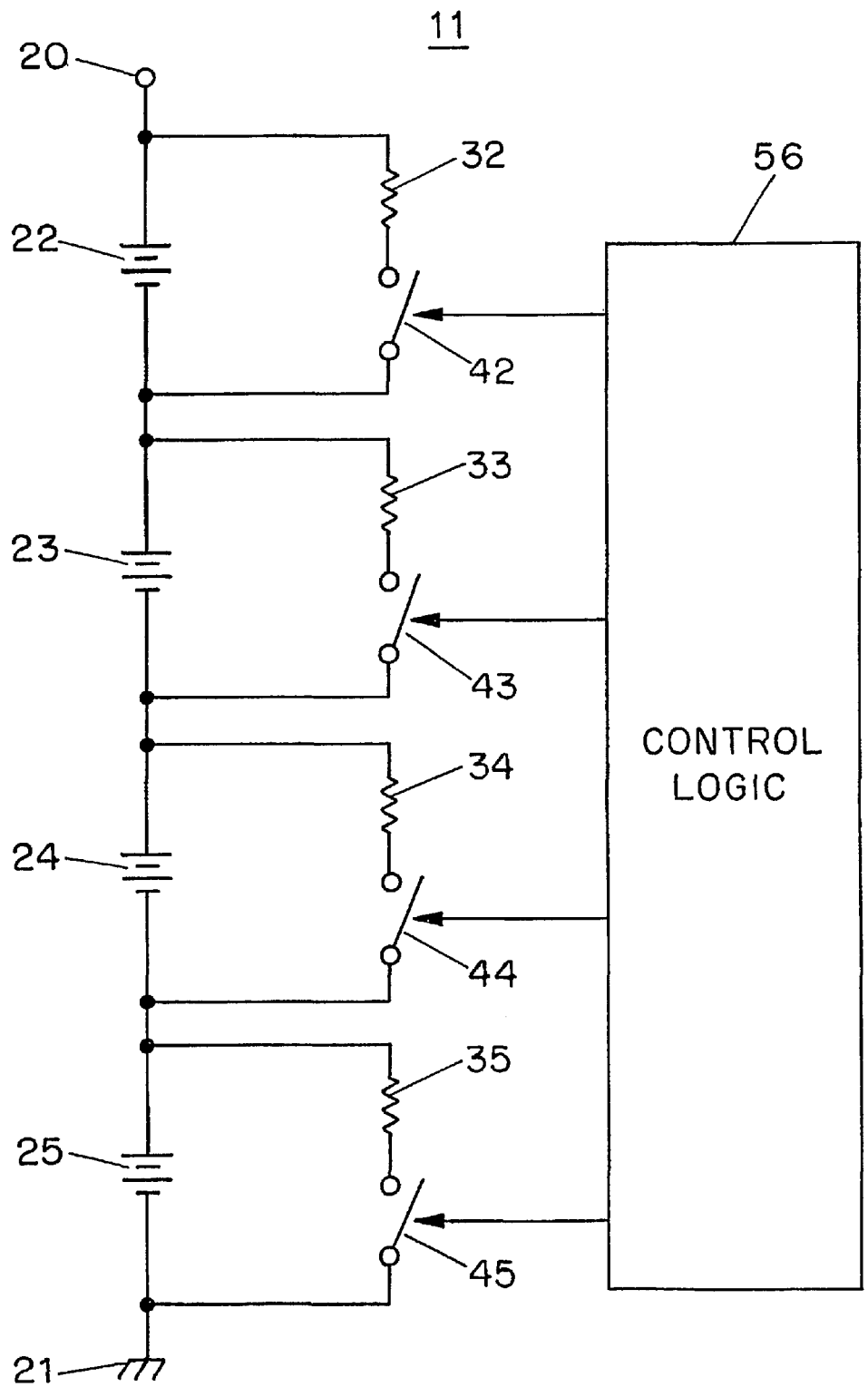
FIG. 1 shows a prior-art charge balancing system using dissipative balancing.

To understand and appreciate the invention fully, it is helpful to discuss one prior-art approach for charge balancing in a battery. This discussion identifies terminology which is helpful in describing embodiments of the invention. FIG. 1 shows a prior-art charge balancing system 11 using dissipative balancing. A number of cells 22, 23, 24, and 25 is disposed in series to define a battery between terminals 20 and 21. Terminals 20, 21 connect to a load (typically an appliance such as a computer or PDA or telephone) and may be connected to a source of charging current for recharging.

Resistors 32, 33, 34, and 35 are associated respectively with the cells 22, 23, 24, and 25 and with switches 42, 43, 44 and 45. Control logic 56 causes the switches to be selectively opened and closed. Each switch, when closed, drains a predictable amount of current from its respective cell through its respective resistor.

During charging, it is possible to use the system to protect a cell that is charging faster than the other cells from overcharging. The switch associated with that cell can be closed, thus discharging the cell slightly (or reducing its rate of charging slightly) so as to bring the cell more nearly into balance with its neighbors.

A similar approach may be followed during discharge. If one cell is seen to progress toward discharge less quickly than others, then the switch for that cell can be turned on, draining that cell a little faster and tending to bring it more into balance with its neighbors.

The control logic 56 thus ideally receives inputs from monitoring circuitry, not shown, which permits identifying cells which are charging or discharging faster or slower than their neighbors.

The system 11 of FIG. 1 has the advantage that it will tend toward balanced charge among cells in a battery, and thus will maximize battery life and postpone failure of any one cell. It has the drawback, however, of wasting energy. Any energy dissipated in a resistor 32, 33, 34, 35 is energy which had to be stored in a heavy battery and yet which does not get used in the appliance. To obtain a particular battery life between rechargings, then, requires a heavier battery than would be used if the dissipative resistor system were not used.

The system 11 of FIG. 1 also requires sensors such as voltage or temperature sensors on each of the cells, to provide inputs to the control logic 56. The sensors must be accurate; if they provide incorrect information the cells will not be handled properly. The algorithm carried out by control logic 56 is complicated. It is possible, through inadvertence, to make mistakes in such algorithms, such as failure to take account of boundary conditions. The control logic risks getting into some internal state which freezes up the system and requires a reset (and thus may require a watchdog timer). Rechargeable battery technologies differ in their response to abuse, but some technologies can risk damage (e.g. thermal runaway) upon failure of the control logic. Simple systems are often less at risk of malfunction.

A crude but limiting case in the programming of the system of FIG. 1 may be seen in a system which employs the resistors and switches only after the battery has "run down" and is ready for recharging. Prior to recharging, the switches are all turned on, and thus each cell discharges fully through its resistor. In this way, all of the cells start from the same initial condition when charging begins. This approach has many drawbacks, not the least of which is that some cell technologies work best if no cell is ever discharged all the way.

Figure 2:
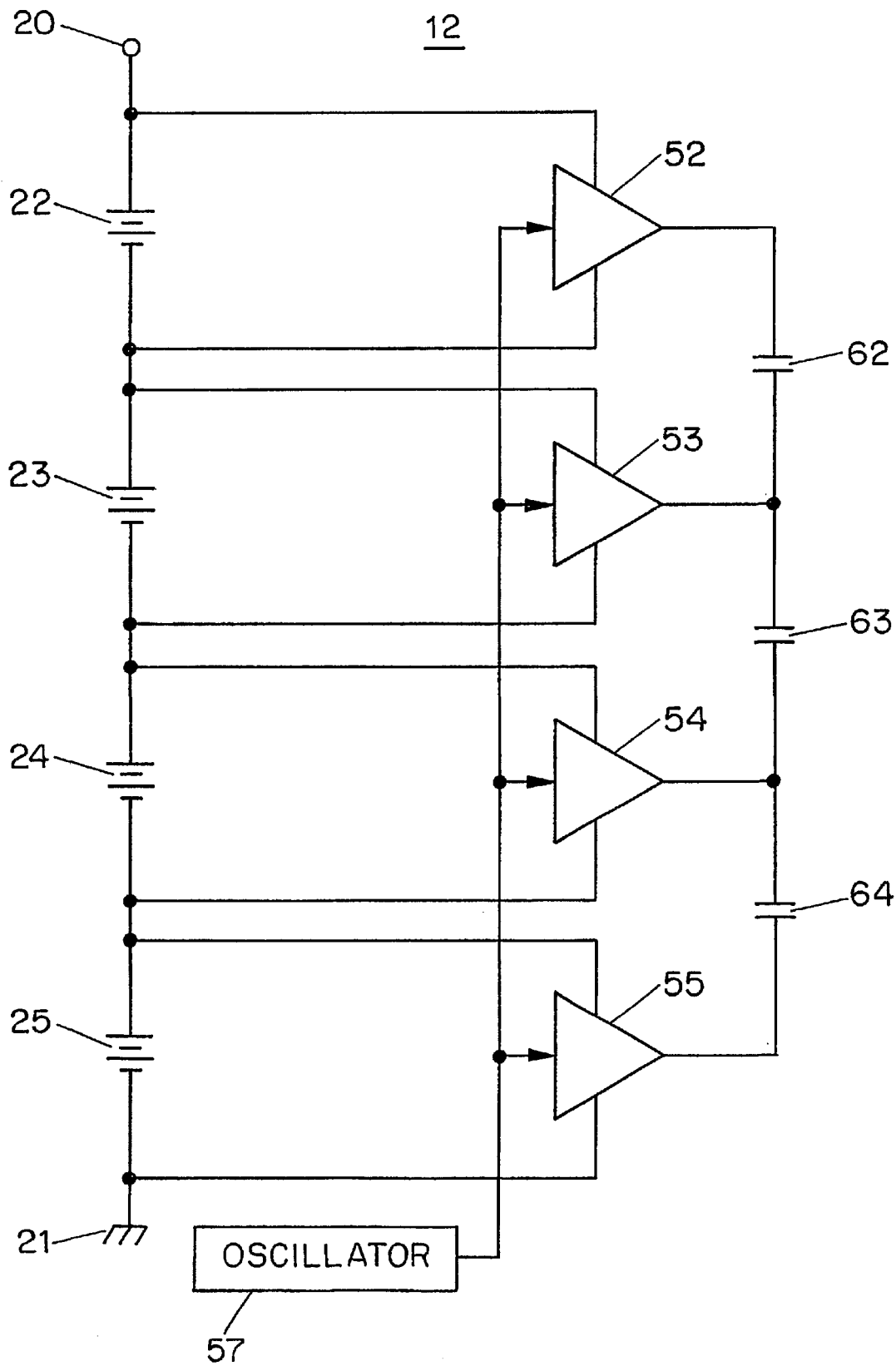
FIG. 2 shows a charge balancing system according to the invention, using nearly the same number of capacitors as cells.

Turning now to FIG. 2, what is shown is a charge balancing system 12 according to the invention. Terminals 20, 21 and cells 22, 23, 24, 25 are as before. Switches 52, 53, 54, 55 serve as level shifters and drivers. Capacitors 62, 63, 64 are as shown. An oscillator 57 causes the switches to move in synchrony. With one state of the oscillator, each of the switches connects its topmost terminal to the rightward terminal and thus to the capacitor array. With another state of the oscillator, each of the switches connects its bottommost terminal to the rightward terminal and thus to the capacitor array.

In this way, the state of affairs is as follows.

A. In one state, capacitors 62, 63, and 64 are paralleled with cells 22, 23, 24 respectively.

B. In the other state, capacitors 62, 63, and 64 are paralleled with cells 23, 24, 25 respectively.

Let us now analyze the system in the (idealized) case where all the cells behave identically to each other, namely, in which each cell always has the same voltage as the other cells, during charge cycles and discharge cycles. In such a case, initially a brief current will flow so that each of the capacitors is charged to the same potential, and thereafter no current will flow into or out of the capacitors. In such an idealized case, the function and performance of the system 12 will be the same regardless of whether the switches and capacitors are present.

The idealized case, however, is not realistic. In a realistic case, it develops from time to time that one of the cells will have a voltage higher or lower than another of the cells. For example, let us suppose that cell 22 has a higher charge than cells 23, 24, 25. Eventually capacitor 62 is placed in parallel with cell 22, and is charged to its level. Later, capacitor 62 is placed in parallel with cell 23. Because it is at a higher voltage, it discharges into the cell 23. After some number of cycles, the cells 22 and 23 will arrive at the same voltage.

Likewise any imbalance between cells 23 and 24 is gradually remedied by the paralleled connections of the capacitor 63 from time to time between the two cells.

Likewise any imbalance between cells 24 and 25 is gradually remedied by the paralleled connections of the capacitor 64 from time to time between the two cells.

In this way, charge is passed upwards and downwards among adjacent cells of the battery so as to keep the cells balanced. During discharge, no one cell is likely to reach full discharge before the others. During charge, no one cell is likely to reach full charge before the others. This postpones the day when the battery would have to be taken out of service because of poor performance of any one cell.

In the discussion of the system 11 of FIG. 1, it was mentioned that many of the circuit elements would have to be quite accurate for the system to work well. It is instructive to consider how tolerant the system 12 of FIG. 2 may be of variations in the components used.

The capacitors 62, 63, 64 need not be identical or even close to identical. The switches 52, 53, 54, 55 do need to be fairly closely matched, at least in terms of their voltage drops. MOSFETs are preferred since they minimize the voltage drops and thus minimize the extent to which one cell could deviate in voltage from a neighboring cell.

The oscillator 57 is not critical. It need not oscillate at any particular frequency, nor is there a requirement that its duty cycle be 50—50.

The conductors between the cells and the switches, and between the switches and the capacitors, need not be large in current carrying capacity. This is because the currents needed to balance the cells' voltages need not be large, since the voltages are unlikely to deviate greatly from each other due to the continuous equalizing that would have previously taken place.

The switches must be bidirectional, since at any moment a cell might need to be charged or discharged. The switches must be break-before-make, that is, they must not permit the cells to be shorted. The sizing of the capacitors is not critical. If the capacitors are too small, then there is the risk that the charge-redistribution system would not be able to keep up with the performance differences of the cells. If the capacitors are too large, then there is the problem that space and weight are taken up by the too-large capacitors.

Stated differently, the apparatus may thus be described as follows. A battery comprises a plurality of n rechargeable cells 22, 23, 24, 25 in series-adjacent connections, each cell having a positive terminal 20 and a negative terminal 21. Also provided are a plurality of switches 52, 53, 54, 55, each corresponding with one of the cells, each switch having first, second, and third terminals, each switch switchable between a first position in which its first and third terminals are connected therebetween and a second position in which its second and third terminals are connected therebetween. The first terminal of each switch is connected with the positive terminal of the corresponding cell, and the second terminal of each switch is connected with the negative terminal of the corresponding cell. N-1 capacitors 62, 63, 64 are provided, each connected between third terminals of adjacent switches. Control circuitry 57 such as an oscillator is provided, causing all of the switches to be switched to the first position, and causing all of the switches to be switched to the second position.

A method of operation of such cells, switches, and capacitors may be described as repeatedly performing the steps in sequence of: causing all of said switches to be switched to said first position; and causing all of said switches to be switched to said second position.

Yet another way to describe a method of operation for use with a battery comprising a plurality of n cells in series adjacent connections, each cell having a positive terminal and a negative terminal; and a plurality of n−1 capacitors in series adjacent connections, is to repeatedly perform the steps in sequence of: connecting the capacitors each in parallel with respective ones of the first through n−1th cells; and connecting the capacitors each in parallel with respective ones of the second through n-th cells. This more general statement, fully consistent with the invention, leaves open the particular manner in which the connections might be made.

Figure 3:
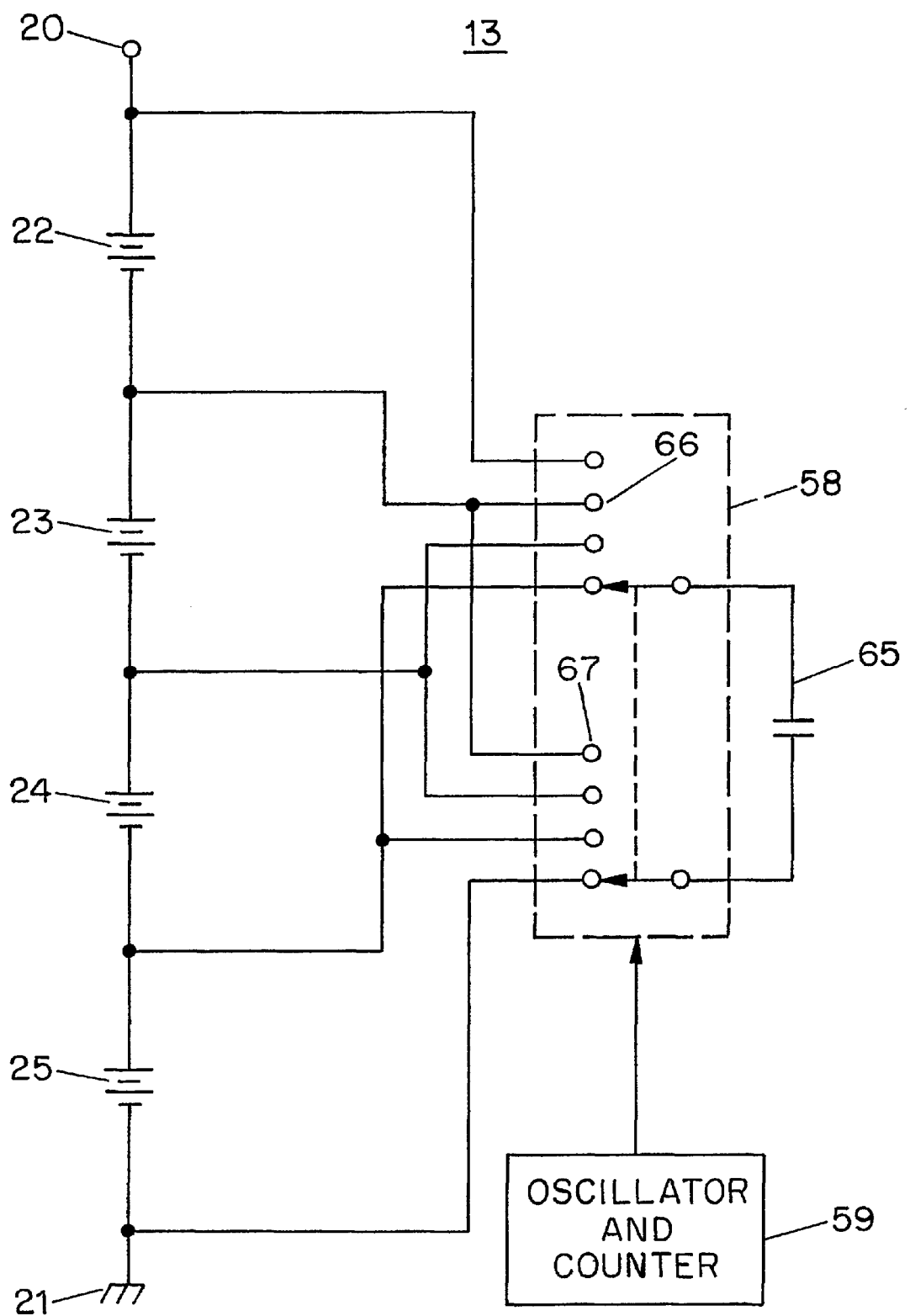
FIG. 3 shows a charge balancing system according to the invention, using a single capacitor.

FIG. 3 shows a charge balancing system 13 according to the invention, using a single capacitor, in an embodiment thus differing from that described above in connection with FIG. 2. Battery 20, 22, 23, 24, 25, 21 is as described above. A two-pole multiplexer 58 is provided, by definition containing within it a first single-pole multiplexer 66 and a second single-pole multiplexer 67. These multiplexers selectively connect capacitor 65 to various of the cells 22, 23, 24, 25. Any cell having a voltage higher than that of the others will tend to charge up the capacitor 65, which will in turn discharge itself into one or more of the cells that had a lower voltage. In this way, the cells are kept more or less in balance with each other. The multiplexer 58 does this under control of an oscillator/counter 59 which causes the multiplexer to move among its positions.

In a simple case, the oscillator/counter 59 steps seriatim through its positions. It will be appreciated, however, that nothing about the inventions requires the multiplexer to step seriatim. Indeed it might be considered desirable to control the multiplexer so that it follows a pseudo-random sequence encompassing all possible two-cell sequences, so that from time to time each cell has an opportunity to pass along charge to each of the other cells.

Describing the apparatus in a different way, what is provided in this embodiment is a battery comprising a plurality of n rechargeable cells 22, 23, 24, 25 in series adjacent connections, each cell having a positive terminal 20 and a negative terminal 21. Also provided are first and second multiplexers 66, 67 each having a plurality of n first terminals and having a second terminal, the first terminals of the first multiplexer connected with the positive terminals of the cells, the first terminals of the second multiplexer connected with the negative terminals of the cells, each multiplexer switchable between n positions in which an n-th first terminal is connected with the second terminal. Also provided is a capacitor 65 connected between second terminals of the first and second multiplexers 66, 67. Also provided is control circuitry 59 causing the first and second multiplexers 66, 67 to be switched to corresponding positions among the n positions.

All that is required is that the two multiplexers 66, 67 be moved in more or less synchrony, so that each cell is paralleled with the capacitor 65 for a nonzero interval of time. The intervals need not be identical, though it is probably simplest to make the intervals identical. Each multiplexer must be break-before-make so that it will not short out a cell. The capacitor 65 need not be of any exact value, but merely needs to be large enough to keep up with whatever possible imbalance of charge turns out to be necessary to correct. If capacitor 65 is too large, this does not degrade system performance in any way but merely takes up space and adds weight. The multiplexers must be bidirectional.

It is also possible to characterize a method to be performed with the cells, multiplexers, and capacitor that have been described, namely: repeatedly performing the step of causing the first and second multiplexers to switch both to a corresponding new position.

A somewhat more general way to characterize the method, without departing in any way from the invention, is that with a battery comprising a plurality of n cells in series adjacent connections, each cell having a positive terminal and a negative terminal; and a capacitor, the method comprises the step of connecting the capacitor in parallel with one of the cells, and repeatedly performing the step of connecting the capacitor in parallel with a different one of the cells than the previously connected cell.

One skilled in the art will have no difficulty identifying at least some of the advantages and disadvantages of the approaches of systems 12 and 13 (FIGS. 2 and 3). System 12 has more capacitors than system 13, which may take up more room and weigh more. (Most of the described components may be provided in an ASIC or other integrated circuit, and the only external component or components are the capacitor or capacitors.) On the other hand, system 12 (for a particular size of capacitor) has greater bandwidth for equalizing charges since at any given instant as many as n−1 current flows may be taking place which tend to equalize charges, while system 13 has at most one current flow taking place at a time.

Interestingly, the two approaches discussed here (systems 12 and 13) require fundamentally the same number of bidirectional switching elements, namely (n−1) times 2.

An overall comparison of the systems according to the invention, as compared with prior-art systems such as that of FIG. 1, shows several advantages.

First, the dissipative system wastes energy as heat in the resistors. In contrast, the system according to the invention can have arbitrarily small heat losses by minimizing system resistances.

Second, the systems according to the invention do not require detailed or sophisticated control. Instead, the charge transfer activity simply stops by itself if and when the cells come to be in balance with each other. These systems are energy-efficient and generate very little heat. System 13 has a very low external-component count (one capacitor).

It is possible to identify other possible advantages. Historically, battery makers find it necessary to try very hard to match cells in a battery, given the "race to the bottom" when one cell fails before the other due to performance that differs from that of the other cells. This cell matching costs money because it forces attention to manufacturing tolerances and the like. With the system according to the invention, however, it may be possible for the total cost of the battery to be reduced, even including the charge balancing circuitry, because the battery maker may find that it is not so critical to match the cells to each other.

Those skilled in the art will appreciate that the precise number of cells, in this case four, is not important to an understanding of the invention, and that indeed the invention offers its benefits regardless of the particular number of cells (so long as it is more than one). Those skilled in the art will also appreciate that while terminal 20 is shown as "positive" and terminal 21 is shown as "ground," these choices are arbitrary. The invention offers its benefits equally well to a positive-ground system for example. Finally, it should be appreciated that while the invention is described in the context of lead-acid, nickel-cadmium, nickel-metal-hydride, and lithium-ion technologies, the invention actually offers its benefits for any rechargeable electrochemical cell used in a battery.

Those skilled in the art will have no difficulty devising myriad obvious variations and improvements upon the invention without departing from the invention in any way, all of which are intended to be encompassed by the claims that follow.

What is claimed is:

1. Apparatus comprising:
    a battery comprising a plurality of n rechargeable cells in series adjacent connections, each cell having a positive terminal and a negative terminal;
    first and second multiplexers each having a plurality of n first terminals and having a second terminal, the first terminals of the first multiplexer connected with the positive terminals of the cells, the first terminals of the second multiplexer connected with the negative terminals of the cells, each multiplexer switchable between n positions in which an n-th first terminal is connected with the second terminal,
    a capacitor connected between second terminals of the first and second multiplexers; and control circuitry causing the first and second multiplexers to be switched to corresponding positions among the n positions.

2. A method for use with a battery comprising a plurality of n rechargeable cells in series adjacent connections, each cell having a positive terminal and a negative terminal; first and second multiplexers each having a plurality of n first terminals and having a second terminal, the first terminals of the first multiplexer connected with the positive terminals of the cells, the first terminals of the second multiplexer connected with the negative terminals of the cells, each multiplexer switchable between n positions in which an n-th first terminal is connected with the second terminal, and a capacitor connected between second terminals of the first and second multiplexers; the method comprising:
    repeatedly performing the step of causing the first and second multiplexers to switch both to a corresponding new position.

3. A method for use with a battery comprising a plurality of n cells in series adjacent connections, each cell having a positive terminal and a negative terminal; and a capacitor, the method comprising the step of connecting the capacitor in parallel with one of the cells, and repeatedly performing the step of:
    connecting the capacitor in parallel with a different one of the cells than the previously connected cell.

* * * * *